(12) United States Patent
Kawamoto

(10) Patent No.: US 11,991,454 B2
(45) Date of Patent: May 21, 2024

(54) IMAGE CAPTURING CONTROL APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Tomohiro Kawamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 17/670,094

(22) Filed: Feb. 11, 2022

(65) Prior Publication Data

US 2022/0263994 A1  Aug. 18, 2022

(30) Foreign Application Priority Data

Feb. 18, 2021  (JP) ................. 2021-024422

(51) Int. Cl.
  *H04N 23/73*  (2023.01)
  *G06V 10/25*  (2022.01)

(52) U.S. Cl.
  CPC ............. *H04N 23/73* (2023.01); *G06V 10/25* (2022.01)

(58) Field of Classification Search
  CPC .......................... H04N 5/2353; G06V 10/25
  See application file for complete search history.

(56) References Cited

U.S. PATENT DOCUMENTS

| | | | |
|---|---|---|---|
| 2009/0073306 A1* | 3/2009 | Kwon | H04N 23/71 348/E5.034 |
| 2017/0142313 A1* | 5/2017 | Gren | H04N 23/741 |
| 2018/0220054 A1* | 8/2018 | Swami | H04N 25/58 |
| 2019/0052791 A1* | 2/2019 | Toyoda | H04N 23/741 |
| 2021/0243352 A1* | 8/2021 | Mcelvain | H04N 25/134 |

FOREIGN PATENT DOCUMENTS

JP  2019161329 A  9/2019

* cited by examiner

*Primary Examiner* — Jason A Flohre
(74) *Attorney, Agent, or Firm* — Canon U.S.A., Inc. IP Division

(57) ABSTRACT

An image capturing control apparatus to control image capturing of an image capturing apparatus includes a first instruction unit configured to instruct the image capturing apparatus to capture a first image by applying an exposure time to each region on an image capturing surface divided into a plurality of regions, a calculation unit configured to calculate an exposure time to be equally applied to the plurality of regions based on the exposure time applied to each region in the first image, and a second instruction unit configured to instruct the image capturing apparatus to capture a second image by equally applying the exposure time calculated by the calculation unit to the plurality of regions.

18 Claims, 6 Drawing Sheets

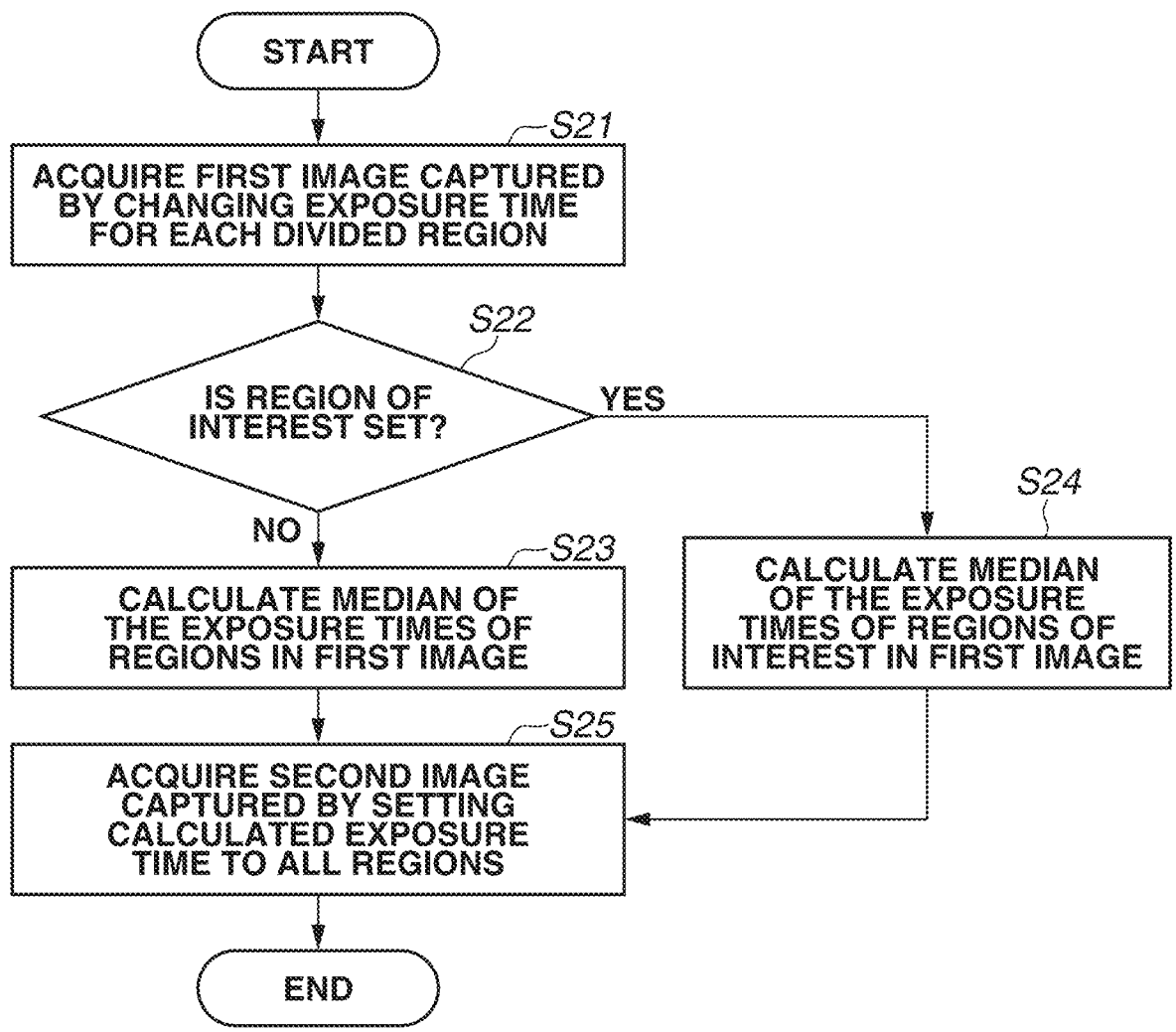

FIG.4A

| REGION | EXPOSURE TIME |
|---|---|
| A1 | 1/30 |
| A2 | 1/300 |
| A3 | 1/30 |

FIG.4B

| REGION | EXPOSURE TIME |
|---|---|
| B1 | 1/50 |
| B2 | 1/300 |
| B3 | 1/50 |

FIG.4C

| REGION | EXPOSURE TIME |
|---|---|
| C1 | 1/50 |
| C2 | 1/500 |
| C3 | 1/30 |

FIG.4D

| REGION | EXPOSURE TIME |
|---|---|
| D1 | 1/30 |
| D2 | 1/500 |
| D3 | 1/30 |

FIG.5A

| REGION | EXPOSURE TIME |
|---|---|
| C2 | 1/500 |
| D2 | 1/500 |
| B2 | 1/300 |

FIG.5B

| REGION | EXPOSURE TIME |
|---|---|
| C2 | 1/500 |
| D2 | 1/500 |
| A2 | 1/300 |
| B2 | 1/300 |
| B1 | 1/50 |
| B3 | 1/50 |
| C1 | 1/50 |
| A1 | 1/30 |
| A3 | 1/30 |
| C3 | 1/30 |
| D1 | 1/30 |
| D3 | 1/30 |

IMAGE CAPTURING CONTROL APPARATUS, IMAGE CAPTURING APPARATUS, CONTROL METHOD, AND STORAGE MEDIUM

BACKGROUND

Field of the Disclosure

The present disclosure relates to an image capturing control apparatus, an image capturing apparatus, an image capturing control method, and a storage medium.

Description of the Related Art

Japanese Patent Application Laid-Open No. 2019-161329 discusses a technique in which an exposure time control unit is provided that controls the exposure time for each pixel or each pixel group of an image capturing unit based on setting values, and in which setting values of exposure times based on photometric values for photometry are made different from those for focus detection.

The technique discussed in Japanese Patent Application Laid-Open No. 2019-161329 allows setting an exposure time for each region obtained by dividing an image. However, it is difficult to reduce a sense of strangeness felt by a user when the user sees the image.

SUMMARY

According to an aspect of the present invention, an image capturing control apparatus to control image capturing of an image capturing apparatus includes a first instruction unit configured to instruct the image capturing apparatus to capture a first image by applying an exposure time to each region on an image capturing surface divided into a plurality of regions, a calculation unit configured to calculate an exposure time to be equally applied to the plurality of regions based on the exposure time applied to each region in the first image, and a second instruction unit configured to instruct the image capturing apparatus to capture a second image by equally applying the exposure time calculated by the calculation unit to the plurality of regions.

Further features of the present invention will become apparent from the following description of exemplary embodiments with reference to the attached drawings.

BRIEF DESCRIPTION OF THE DRAWINGS

FIG. 2 is a flowchart illustrating an image capturing control method according to the first exemplary embodiment.

FIGS. 4A to 4D each illustrate a setting example of exposure times for divided regions according to the first exemplary embodiment.

FIGS. 5A and 5B each illustrate an example of calculating the exposure time of the second image according to the first exemplary embodiment.

DESCRIPTION OF THE EMBODIMENTS

Some exemplary embodiments of the present invention will be described in detail below with reference to the accompanying drawings. The following exemplary embodiments are not meant to limit the present invention and not all combinations of features described in the exemplary embodiments are used in the solution of the present invention. Configurations according to the exemplary embodiments can be appropriately corrected or changed depending on specifications of and various conditions (use conditions, use environments, etc.) for an apparatus to which the present invention is applied. The technical scope of the present invention is defined by the claims and is not limited by the following individual exemplary embodiments.

Figure 1:
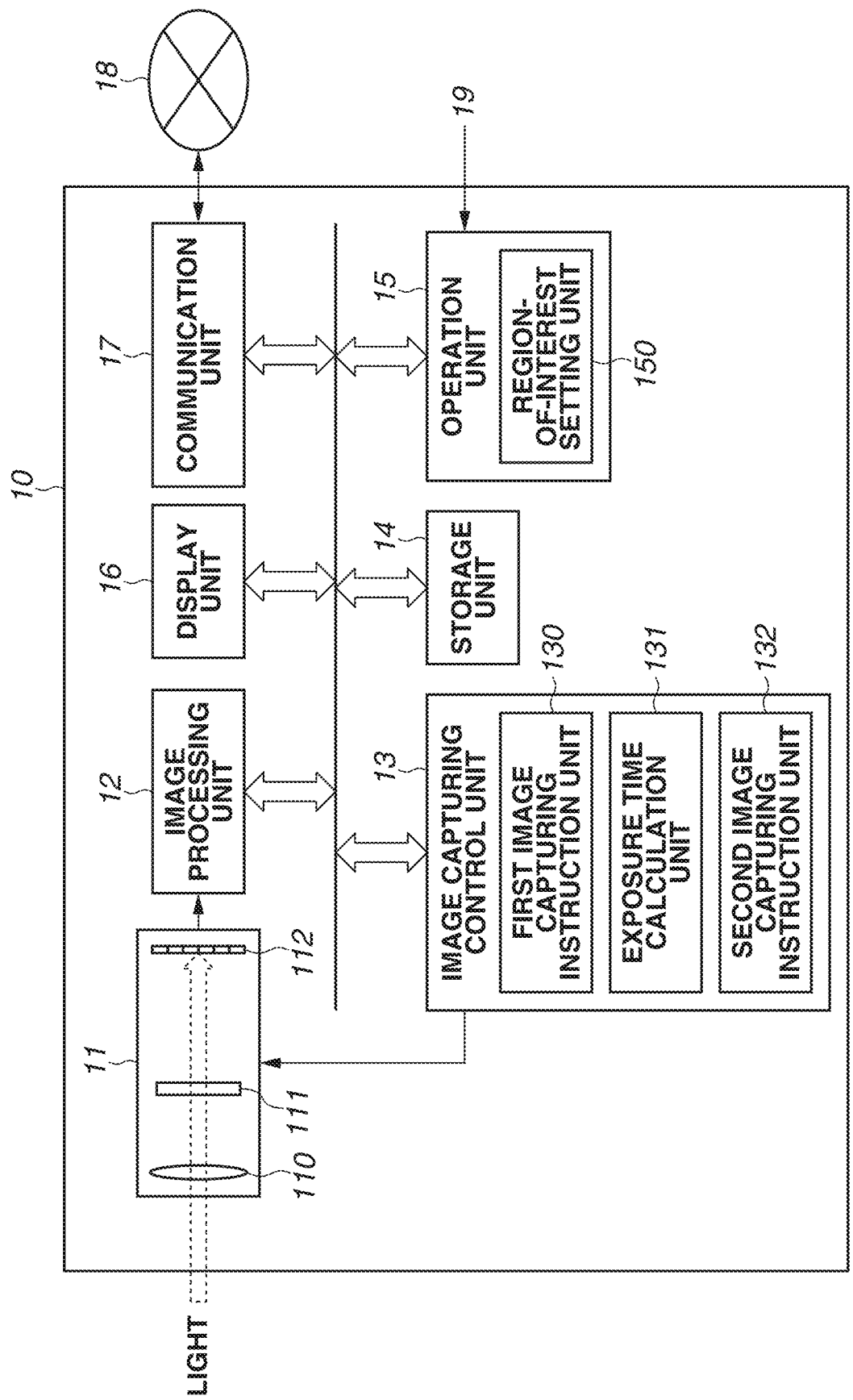
FIG. 1 is a block diagram illustrating a configuration example of an image capturing apparatus according to a first exemplary embodiment.

FIG. 1 is a block diagram illustrating a configuration example of an image capturing apparatus according to a first exemplary embodiment.

In functional blocks illustrated in FIG. 1, for functions to be implemented with software, programs for providing the functions of the functional blocks are stored in a memory, such as a read-only memory (ROM). The programs are loaded into a random access memory (RAM) and are run by a central processing unit (CPU), thereby implementing the functions. Functions implemented with hardware may be provided, for example, by automatically generating a dedicated circuit on a field programmable gate array (FPGA) based on programs for implementing the functions of the functional blocks using a predetermined compiler. The functions implemented with hardware may also be provided by forming a gate array circuit, like the FPGA, or by forming an application specific integrated circuit (ASIC). The configuration of the functional blocks illustrated in FIG. 1 is illustrated by way of example. A plurality of functional blocks may constitute one functional block. Any one of the functional blocks may be divided into blocks for performing a plurality of functions.

As illustrated in FIG. 1, an image capturing apparatus 10 includes an image capturing unit 11, an image processing unit 12, an image capturing control unit 13, a storage unit 14, an operation unit 15, a display unit 16, and a communication unit 17. The image capturing unit 11 includes an imaging optical system 110, a diaphragm 111, and a solid-state imaging device 112. The image capturing control unit 13 includes a first image capturing instruction unit 130, an exposure time calculation unit 131, and a second image capturing instruction unit 132. The operation unit 15 includes a region-of-interest setting unit 150.

The image capturing unit 11 captures an image based on light from an object. The imaging optical system 110 forms an image of light from the object on the solid-state imaging device 112. FIG. 1 illustrates the imaging optical system 110 as a single lens. However, the imaging optical system 110 may include a plurality of lenses, for example, including a zoom lens, a focus lens, and a shake correction lens. The diaphragm 111 adjusts the quantity of light that passes through the imaging optical system 110 and enters the solid-state imaging device 112. The solid-state imaging device 112 converts the light into an electric signal in each pixel, and outputs the electric signal. The solid-state imaging device 112 can set an exposure time for each region obtained by an image being divided. Each divided region can include one or more pixels. The solid-state imaging device 112 is, for example, a semiconductor device, such as a charge-coupled device (CCD) sensor or a complementary metal oxide semiconductor (CMOS) sensor, and the peripheral circuitry.

The image processing unit 12 performs an analog-to-digital (A/D) conversion on the image signal sent from the solid-state imaging device 112 to convert the image signal into digital data, and then performs signal processing including demosaicing processing, white balance processing, and gamma processing on the digital data to thereby generate a digital image.

The image capturing control unit 13 drives the imaging optical system 110 in zooming and focusing, controls the aperture diameter of the diaphragm 111, and controls the gain and the exposure time for each region of the solid-state imaging device 112. The image capturing control unit 13 here calculates an exposure time to be equally applied to a plurality of divided regions included in the image based on the exposure times for the divided regions, thereby making it possible to cause the image capturing unit 11 to perform image capturing. An exposure time for each divided region may be used for each of all the divided regions included in the image, or for each of the divided regions including a region of interest set in the image. The divided regions constitutes, for example, the entire image. For example, the image capturing control unit 13 can calculate an exposure time to be applied to the entire image based on the distribution of the exposure times for the divided regions. The image capturing control unit 13 may calculate an exposure time to be applied to the entire image based on the median of the exposure times for the divided regions. If the number of pieces of data is an even number, the median may be one of the values of two pieces of data closest to the midpoint, or may be the average value of the values of two pieces of data closest to the midpoint. The image capturing control unit 13 may use a mode of the exposure times for the divided regions instead of the median of the exposure times for the divided regions.

The first image capturing instruction unit 130 instructs the image capturing unit 11 to obtain a first image captured based on the exposure time set for each of the divided regions. The exposure time calculation unit 131 calculates an exposure time to be equally applied to a plurality of divided regions included in the image based on the exposure time for each divided region. The second image capturing instruction unit 132 instructs the image capturing unit 11 to obtain a second image captured based on the exposure time calculated by the exposure time calculation unit 131.

A first image here can be used as, for example, a monitoring image, and a second image here can be used as, for example, an evidential image, an ornamental image, or a thumbnail image. A first image used as a monitoring image enhances the dynamic range of it, which would lead to improvement of the surveillance performance for monitoring, for example, illegal dumping at night. A second image used as an evidential image allows submission of a natural image without any strangeness as an evidential material, which would lead to establishment of the evidence capability.

The storage unit 14 stores first images and second images generated by the image processing unit 12. The storage unit 14 may include a volatile memory such as a RAM, or may include a nonvolatile memory such as a Not AND (NAND) flash memory.

The operation unit 15 receives an instruction 19 from a user. The operation unit 15 is, for example, a button, a mode dial, or a touch panel attached to the display unit 16. The operation unit 15 provides the user with an operation environment for setting a region of interest. The region-of-interest setting unit 150 sets a region of interest in the image based on the instruction 19 from the user.

The display unit 16 displays a first image and a second image generated by the image processing unit 12. The display unit 16 also displays the region of interest set based on the instruction 19 from the user. The display unit 16 is a display such as a cathode ray tube (CRT) display, a liquid crystal display, or an organic electro-luminescence (EL) display. The display unit 16 may be a touch screen or a touch panel.

The communication unit 17 sends the first image and the second image generated by the image processing unit 12. The communication unit 17 converts captured images sent from the image processing unit 12 based on network protocols, and sends converted images to a network 18.

The network 18 is, for example, a local area network (LAN), and includes a router or the like that meets communication standards such as Ethernet®. The image capturing apparatus 10 and a client apparatus (not illustrated) are connected to the network 18 with a LAN cable or other tools.

FIG. 2 is a flowchart illustrating an image capturing control method according to the first exemplary embodiment.

Each step in FIG. 2 is implemented by a program stored in the storage unit 14 of the image capturing apparatus 10 illustrated in FIG. 1 being read out and run by the image capturing control unit 13. At least some of the steps in the flowchart illustrated in FIG. 2 may be implemented with hardware. If the steps are implemented with hardware, for example, a dedicated circuit may be automatically generated on an FPGA based on the program for implementing each step using a predetermined complier. The steps may be implemented with hardware using a gate array circuit, like the FPGA, or using an ASIC.

In this case, each block in the flowchart illustrated in FIG. 2 can be regarded as a hardware block. A plurality of bocks may constitute one hardware block, or any one of the blocks may be divided into a plurality of hardware blocks.

As illustrated in FIG. 2, in step S21, the image capturing control unit 13 causes the solid-state imaging device 112 to capture a first image with each optimized exposure time set for each divided region, thereby acquiring the first image captured by the solid-state imaging device 112. In this case, the image capturing control unit 13 can set exposure time information about each divided region.

Next, in step S22, the image capturing control unit 13 determines whether a region of interest is set by the region-of-interest setting unit 150. If a region of interest is set (YES in step S22), the processing proceeds to step S24. In step S24, the image capturing control unit 13 calculates the median of the exposure times for the divided regions including the region of interest in the exposure time information about each divided region in the first image set in step S21. Otherwise (NO in step S22), the processing proceeds to step S23. In step S23, the image capturing control unit 13 calculates the median based on the exposure time information about each divided region in the first image set in step S21.

Next, the image capturing control unit 13 equally sets the exposure time calculated in step S23 or S24 for the divided regions of the solid-state imaging device 112. In step S25, the image capturing control unit 13 acquires a second image captured by the solid-state imaging device 112.

Figure 3A:
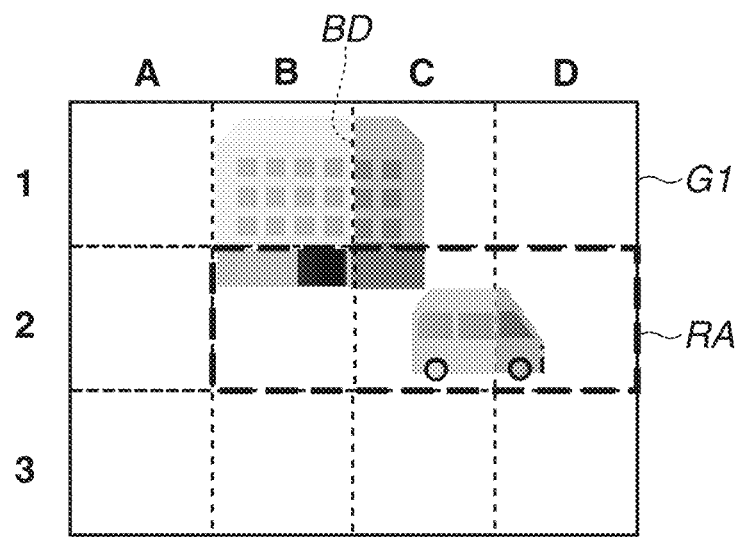
FIG. 3A illustrates an example of a first image according to the first exemplary embodiment.
Figure 3B:
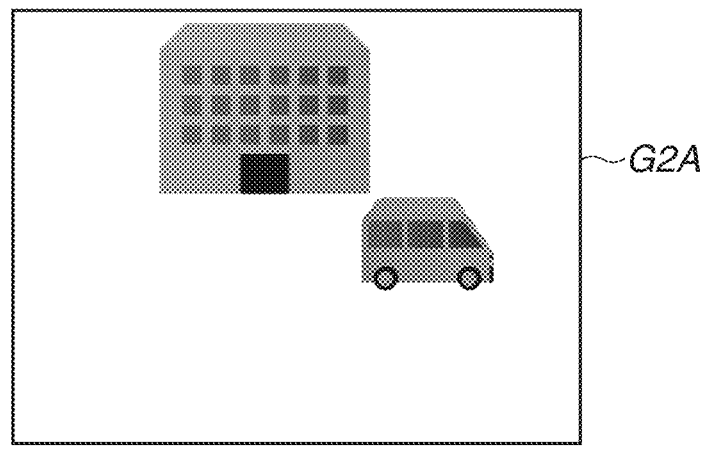
FIG. 3B illustrates an example of a second image when a region of interest is set in the first image.
Figure 3C:
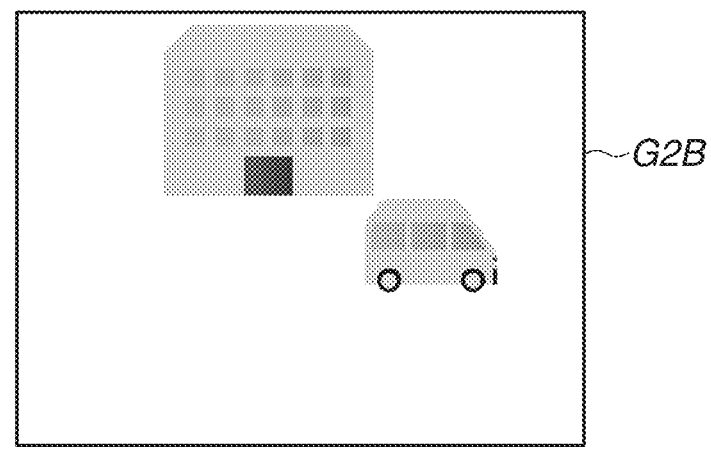
FIG. 3C illustrates an example of the second image when the region of interest is not set in the first image.

FIG. 3A illustrates an example of the first image according to the first exemplary embodiment. FIG. 3B illustrates an example of the second image when a region of interest RA is set in the first image. FIG. 3C illustrates an example of the second image when no region of interest RA is set in the first image.

In the example illustrated in FIG. 3A, a first image G1 is divided into, for example, 3 (vertically)×4 (horizontally)=12 regions A1 to A3, B1 to B3, C1 to C3, and D1 to D3. In this case, the image capturing control unit 13 illustrated in FIG. 1 can set individual exposure times for the divided regions A1 to A3, B1 to B3, C1 to C3, and D1 to D3. The region of interest RA can be set in the first image G1. FIG. 3A illustrates an example where the region of interest RA is formed by the divided regions B2, C2, and D2.

In this case, the individual exposure times are set for the divided regions A1 to A3, B1 to B3, C1 to C3, and D1 to D3, thereby obtaining the first image G1 in which loss of gradation can be prevented even in an environment with a wide dynamic range of brightness due to the coexistence of regions with high illuminance and regions with low illuminance.

Individual exposure times set to obtain optimal exposure amounts for the divided regions A1 to A3, B1 to B3, C1 to C3, and D1 to D3 cause block-like brightness step differences (hereinafter referred to as block step differences) at boundaries between regions with different exposure times. Thus, a block step difference BD occurs in the first image G1, which may cause the user to feel a sense of strangeness in the image, unlike an image captured with an exposure time applied to the entire image.

If the region of interest RA is set in the first image G1, the image capturing control unit 13 calculates an exposure time to be applied to the entire image based on the median of the exposure times for the divided regions B2, C2, and D2 included in the region of interest RA. Then, the image capturing control unit 13 causes the solid-state imaging device 112 to perform image capturing with the exposure time for the entire image equally applied to the divided regions A1 to A3, B1 to B3, C1 to C3, and D1 to D3. As illustrated in FIG. 3B, a second image G2A, in which the block step difference BD illustrated in FIG. 3A is eliminated and the exposure amount for the region of interest RA is optimized, is obtained.

If no region of interest RA is set in the first image G1, the image capturing control unit 13 calculates an exposure time to be applied to the entire image based on the median of the exposure times for the divided regions A1 to A3, B1 to B3, C1 to C3, and D1 to D3 in the first image G1. Then, the image capturing control unit 13 causes the solid-state imaging device 112 to perform image capturing with the exposure time for the entire image equally applied to the divided regions A1 to A3, B1 to B3, C1 to C3, and D1 to D3. As a result, as illustrated in FIG. 3C, a second image G2B, in which the block step difference BD illustrated in FIG. 3A is eliminated, is obtained.

The image capturing control unit 13 can use the median of the exposure times for the divided regions in the first image as the exposure time for the second image. This provides an optimal exposure amount as compared with a case where the average value of the exposure times for the divided regions in the first image is used as the exposure time for the second image. For example, the average value of the exposure times for the divided regions including one darker divided region than the other divided regions used for a second image causes a lower brightness of the entire image because the brightness of the entire image is shifted toward the darker brightness of the divided region. On the other hand, use of the median of the exposure times for the divided regions in the first image is used as the exposure time for the second image prevents the brightness of the entire image from being lowered even with one darker divided region included among a plurality of divided region.

FIGS. 4A to 4D each illustrate a setting example of exposure times for divided regions according to the first exemplary embodiment. FIG. 4A illustrates a setting example of the exposure times for the divided regions A1 to A3 in the first image G1 illustrated in FIG. 3A. FIG. 4B illustrates a setting example of the exposure times for the divided regions B1 to B3 in the first image G1 illustrated in FIG. 3A. FIG. 4C illustrates a setting example of the exposure times for the divided regions C1 to C3 in the first image G1 illustrated in FIG. 3A. FIG. 4D illustrates a setting example of the exposure times for the divided regions D1 to D3 in the first image G1 illustrated in FIG. 3A.

In the examples illustrated in FIGS. 4A to 4D, to capture a first image, each exposure time is set optimally for the corresponding exposure amount of the exposure amounts for the divided regions A1 to A3, B1 to B3, C1 to C3, and D1 to D3 can be optimized. For example, as illustrated in FIG. 4A, the exposure times for the divided regions A1 and A3 are set to $\frac{1}{30}$ seconds, and the exposure time for the divided region 2 is set to $\frac{1}{300}$ seconds.

FIGS. 5A and 5B each illustrate an example of calculating the exposure time of the second image according to the first exemplary embodiment. FIG. 5A illustrates an example of the median with the region of interest RA set in the first image G1 illustrated in FIG. 3A. FIG. 5B illustrates an example of the median with no region of interest RA set in the first image G1 illustrated in FIG. 3A.

In the example illustrated in FIG. 5A, with the region of interest RA set in the first image G1 illustrated in FIG. 3A, the image capturing control unit 13 calculates the median based on the exposure times for the divided regions B2, C2, and D2 included in the region of interest RA. In the example illustrated in FIG. 5A, the median of the exposure times for the divided regions B2, C2, and D2 is $\frac{1}{500}$ seconds, which corresponds to the exposure time for the divided region D2. With the region of interest RA set in the first image G1 here, the calculation of the median based on the exposure times for the divided regions B2, C2, and D2 included in the region of interest RA allows optimization of the exposure amount for the region of interest RA as compared with a case of calculating the median of the exposure times for the entire image.

In the example illustrated in FIG. 5B, with no region of interest RA set in the first image G1 illustrated in FIG. 3A, the image capturing control unit 13 calculates the median based on the exposure times for the divided regions A1 to A3, B1 to B3, C1 to C3, and D1 to D3 included in the first image G1. In the example illustrated in FIG. 5B, the median of the exposure times for the divided regions A1 to A3, B1 to B3, C1 to C3, and D1 to D3 is $\frac{1}{50}$ seconds, which corresponds to the exposure time for the divided region B3.

As described above, according to the first exemplary embodiment, the image capturing apparatus 10 acquires a first image with an exposure time set for each individual divided region, thereby making it possible to capture an image with an appropriate exposure even in an environment with mixed illuminances of high illuminance regions and a low illuminance regions. Further, the image capturing apparatus 10 sets an exposure time for the entire image based on the median of the exposure times calculated based on the exposure time information about the first image, thereby making it possible to acquire a second image that reduces a sense of strangeness.

Other Exemplary Embodiments

Figure 6:
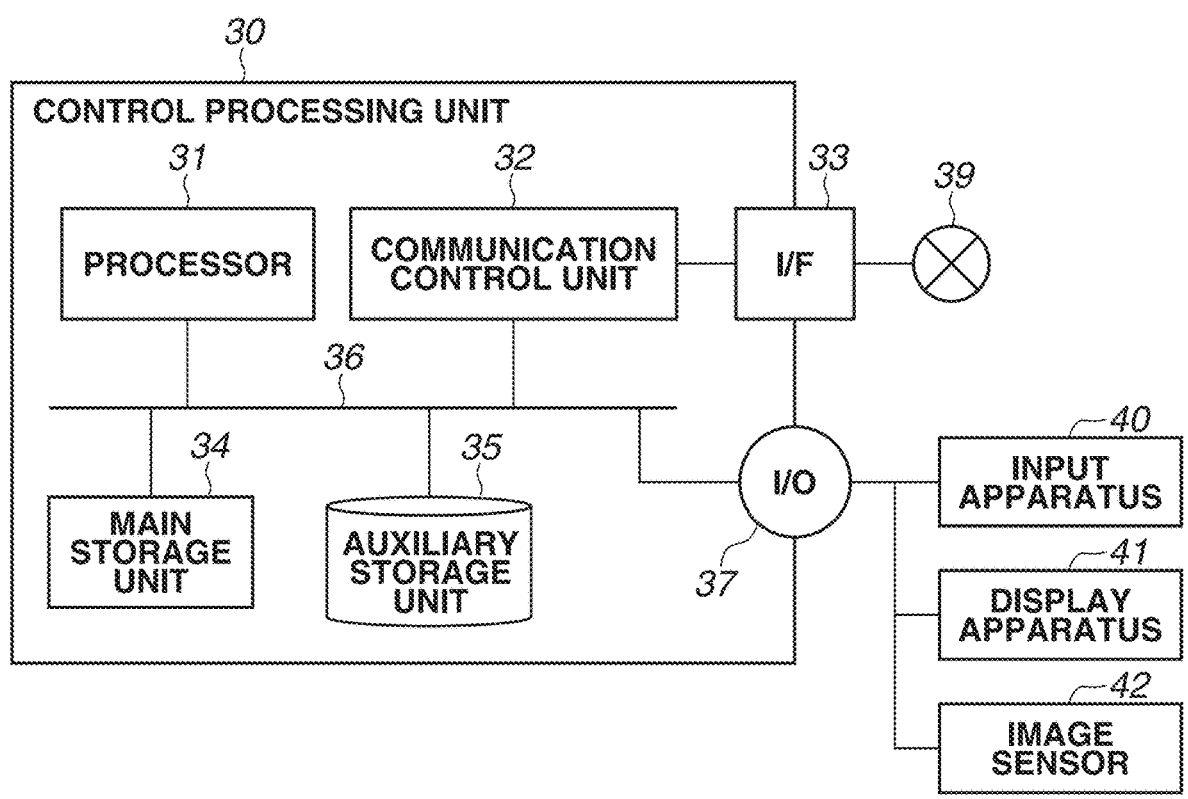
FIG. 6 is a block diagram illustrating a hardware configuration example of a control processing unit according to another exemplary embodiment.

FIG. 6 is a block diagram illustrating a hardware configuration example of a control processing unit that can be applied to the image capturing apparatus 10 illustrated in FIG. 1.

A control processing unit 30 illustrated in FIG. 6 can implement functions to be implemented with software among the functions of the image capturing apparatus 10 illustrated in FIG. 1 on the image capturing apparatus 10. The control processing unit 30 here can implement the functions of the image processing unit 12 and the image capturing control unit 13 illustrated in FIG. 1. Further, the control processing unit 30 can cause the image capturing unit 11, the image processing unit 12, the image capturing control unit 13, the storage unit 14, the operation unit 15, the display unit 16, and the communication unit 17 illustrated in FIG. 1 to operate in cooperation with one another.

The control processing unit 30 includes a processor 31, a communication control unit 32, a communication interface 33, a main storage unit 34, an auxiliary storage unit 35, and an input/output interface 37. The processor 31, the communication control unit 32, the communication interface 33, the main storage unit 34, the auxiliary storage unit 35, and the input/output interface 37 are interconnected via an internal bus 36. The main storage unit 34 and the auxiliary storage unit 35 are accessible from the processor 31.

An input apparatus 40, a display apparatus 41, and an image sensor 42 are provided outside the control processing unit 30. The input apparatus 40, the display apparatus 41, and the image sensor 42 are each connected to the internal bus 36 via the input/output interface 37. The input apparatus 40 is, for example, a keyboard, a mouse, a touch panel, a card reader, or an audio input apparatus. The display apparatus 41 is, for example, a liquid crystal monitor, an organic EL display, or a micro light-emitting diode (LED) display. The image sensor 42 is, for example, a CCD sensor or a CMOS sensor.

The processor 31 controls the general operation of the control processing unit 30. The processor 31 may be a CPU or a graphics processing unit (GPU). The processor 31 may be a single core processor or a multicore processor. The processor 31 may include a hardware circuit (e.g., FPGA or ASIC) such as an accelerator for speeding up some processing.

The main storage unit 34 can be a semiconductor memory such as a static random access memory (SRAM) or a dynamic random access memory (DRAM). The main storage unit 34 can store programs being run by the processor 31, and can provide a work area for the processor 31 to run programs.

The auxiliary storage unit 35 is a nonvolatile storage device and is, for example, a ROM, a hard disk device, or a solid state drive (SSD). The auxiliary storage unit 35 can hold executable files for various programs and data used to run programs.

The communication control unit 32 is hardware including a function for controlling communication with external apparatus. The communication control unit 32 is connected to a network 39 via the communication interface 33. The network 39 may be the Internet, a wide area network (WAN), a LAN such as Wi-Fi® or Ethernet®, or a combination of the Internet, WAN, and LAN.

The input/output interface 37 converts data input from the input apparatus 40 and the image sensor 42 into a data format processible by the processor 31, and converts data output from the processor 31 into a data format processible by the display apparatus 41.

The processor 31 loads programs stored in the auxiliary storage unit 35 into the main storage unit 34, and runs the loaded programs, implementing the processing illustrated in FIG. 2.

The programs for implementing the processing illustrated in FIG. 2 may be run by a plurality of processors or computers. Alternatively, the processor 31 may instruct a cloud computer or the like to run some or all of the programs for implementing the processing illustrated in FIG. 2 via the network 39, and may receive the execution results.

According to the present invention, a program for implementing one or more functions according to the above-described exemplary embodiments may be fed to a system or an apparatus via a network or a storage medium. The one or more functions according to the above-described exemplary embodiments can also be implemented by processing in which one or more processors in a computer of the system or the apparatus read out and run the program. The functions can also be implemented by a circuit (e.g., FPGA or ASIC) for implementing one or more functions according to the above-described exemplary embodiments.

The some exemplary embodiments of the present invention have been described above. However, the present invention is not limited to the above-described exemplary embodiments and can be modified and changed in various ways within the scope of the invention. For example, while the above-described exemplary embodiments illustrate an example where a first image and a second image are acquired, the image capturing apparatus 10 may also acquire any other images, such as an image obtained by clipping the region of interest alone, other than a first image and a second image. Alternatively, a correction unit may be provided to generate a third image corrected to reduce brightness differences at boundaries between adjacent regions in the first image, and the first image and the second image and/or the third image may be acquired.

The present invention can also be applied to still image capturing and moving image capturing. Particularly, in moving image capturing, the image capturing control unit 13 may cause the image capturing unit 11 to capture a first image alone at a frame rate that is greater than or equal to the corresponding setting value, and may cause the image capturing unit 11 to capture a first image and a second image at a frame rate that is smaller than the corresponding setting value. For example, to perform image capturing at a maximum frame rate at which the solid-state imaging device 112 can operate not to exceed the maximum operating capability of the solid-state imaging device 112, the image capturing control unit 13 may cause the image capturing unit 11 to capture a first image alone. To performing image capturing at a frame rate smaller than the maximum frame rate at which the solid-state imaging device 112 can operate, the image capturing control unit 13 may cause the image capturing unit 11 to capture both a first image and a second image. Thus, if the load on the processor 31 illustrated in FIG. 6 is light enough, the image capturing unit 11 can cause the image capturing unit 11 to capture both a first image and a second image, preventing the processing of the processor 31 from being delayed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-024422, filed Feb. 18, 2021, which is hereby incorporated by reference herein in its entirety.

What is claimed is:

1. An image capturing control apparatus to control image capturing of an image capturing apparatus, the image capturing control apparatus comprising:
    at least one processor; and
    a memory coupled to the at least one processor, the memory storing instructions that, when executed by the at least one processor, cause the at least one processor to:
    instruct the image capturing apparatus to capture a first image with first exposure times applied to a plurality of regions of an image sensor included in the image capturing apparatus;
    calculate a second exposure time to be equally applied to the plurality of regions based on the first exposure times; and
    instruct the image capturing apparatus to capture a second image with the second exposure time equally applied to the plurality of regions,
    wherein the second exposure time is calculated to be equally applied to the plurality of regions based on a median of the first exposure times.

2. The image capturing control apparatus according to claim 1, wherein the plurality of regions corresponds to an entire region of the image sensor.

3. The image capturing control apparatus according to claim 1, wherein the second exposure time to be equally applied to the plurality of regions is calculated based on a distribution of the first the exposure times for the plurality of regions.

4. The image capturing control apparatus according to claim 1, wherein the instructions further cause the at least one processor to set a region of interest in an image captured by the image capturing apparatus,
    wherein, with the region of interest set, the second exposure time to be equally applied to the plurality of regions is calculated based on an exposure time for the region of interest.

5. The image capturing control apparatus according to claim 1, wherein the first image is used as a monitoring image.

6. The image capturing control apparatus according to claim 1, wherein the second image is used as a thumbnail image.

7. The image capturing control apparatus according to claim 1, the instructions further cause the at least one processor to store the first image and the second image.

8. The image capturing control apparatus according to claim 1,
    wherein, with a frame rate of the image capturing apparatus greater than or equal to a predetermined value, the image capturing apparatus is instructed to capture the first image, and not to capture the second image, and
    wherein, with the frame rate of the image capturing apparatus smaller than the predetermined value, the image capturing apparatus is instructed to capture both the first image and the second image.

9. An image capturing apparatus comprising:
    at least one processor; and
    a memory coupled to the at least one processor, the memory storing instructions that, when executed by the at least one processor, cause the at least one processor to:
    instruct the image capturing apparatus to capture a first image with first exposure times applied to a plurality of regions of an image sensor included in the image capturing apparatus;
    calculate a second exposure time to be equally applied to the plurality of regions based on the first exposure times; and
    instruct the image capturing apparatus to capture a second image with the second exposure time equally applied to the plurality of regions,
    wherein the second exposure time is calculated to be equally applied to the plurality of regions based on a median of the first exposure times.

10. A control method of controlling image capturing of an image capturing apparatus, the control method comprising:
    instructing the image capturing apparatus to capture a first image with first exposure times applied to a plurality of regions of an image sensor included in the image capturing apparatus;
    calculating a second exposure time to be equally applied to the plurality of regions based on the first exposure times; and
    instructing the image capturing apparatus to capture a second image with the second exposure time equally applied to the plurality of regions,
    wherein the second exposure time is calculated to be equally applied to the plurality of regions based on a median of the first exposure times.

11. The control method according to claim 10, wherein the plurality of regions corresponds to an entire region of the image sensor.

12. The control method according to claim 10, wherein the second exposure time to be equally applied to the plurality of regions is calculated based on a distribution of the first the exposure times for the plurality of regions.

13. The control method according to claim 10, further comprising setting a region of interest in an image captured by the image capturing apparatus, wherein, with the region of interest set, the second exposure time to be equally applied to the plurality of regions is calculated based on an exposure time of the region of interest.

14. The control method according to claim 10, wherein the first image is used as a monitoring image.

15. The control method according to claim 10, wherein the second image is used as a thumbnail image.

16. The control method according to claim 10, wherein the first image and the second image are stored.

17. The control method according to claim 10,
wherein, with a frame rate of the image capturing apparatus greater than or equal to a predetermined value, the image capturing apparatus is instructed to capture the first image and is not instructed to capture the second image, and
wherein, with the frame rate of the image capturing apparatus smaller than the predetermined value, the image capturing apparatus is instructed to capture both the first image and the second image.

18. A non-transitory computer-readable storage medium that stores a program for causing a computer to execute a control method, the control method comprising:
instructing the image capturing apparatus to capture a first image with first exposure times applied to a plurality of regions of an image sensor included in the image capturing apparatus;
calculating a second exposure time to be equally applied to the plurality of regions based on the first exposure times; and
instructing the image capturing apparatus to capture a second image with the second exposure time equally applied to the plurality of regions,
wherein the second exposure time is calculated to be equally applied to the plurality of regions based on a median of the first exposure times.

* * * * *